No. 12,434. REISSUED JAN. 9, 1906.

T. LITWILLER.

WIRE FENCE FABRIC.

APPLICATION FILED NOV. 2, 1904.

Witnesses:-
S. H. Gibson
Anna C. Ruez

Inventor.
Thomas Litwiller
By Chas. Wm. La Porte, Atty.

UNITED STATES PATENT OFFICE.

THOMAS LITWILLER, OF TREMONT, ILLINOIS.

WIRE-FENCE FABRIC.

No. 12,434. Specification of Reissued Letters Patent. Reissued Jan. 9, 1906.

Original No. 769,223, dated September 6, 1904. Application for reissue filed November 2, 1904. Serial No. 231,159.

*To all whom it may concern:*

Be it known that I, THOMAS LITWILLER, a citizen of the United States, residing at Tremont, in the county of Tazewell, in the State of Illinois, have invented a new and useful Improvement in Wire-Fence Fabrics, of which the following is a specification.

This invention has reference to wire fencing.

The object of the invention is to provide a wire-fence fabric formed of body-wires and selvage-wires, and connected or intertwisted with the body and selvage-wires are wire stays that bear diagonally to the body of the fence and are connected or intertwisted with the selvage and body wires where they intersect alternately over and under.

A further object of the invention is to provide a wire-fence fabric composed of body-wires and selvage-wires, and connected or intertwisted with the body and selvage wires are stay-wires which extend obliquely or diagonally across the body-wires from selvage-wire to selvage-wire and forming an arc between their ends, the said stay-wires at each succeeding point of intersection with the selvage and body wires connected or twisted therewith alternately over and under.

Figure 1:
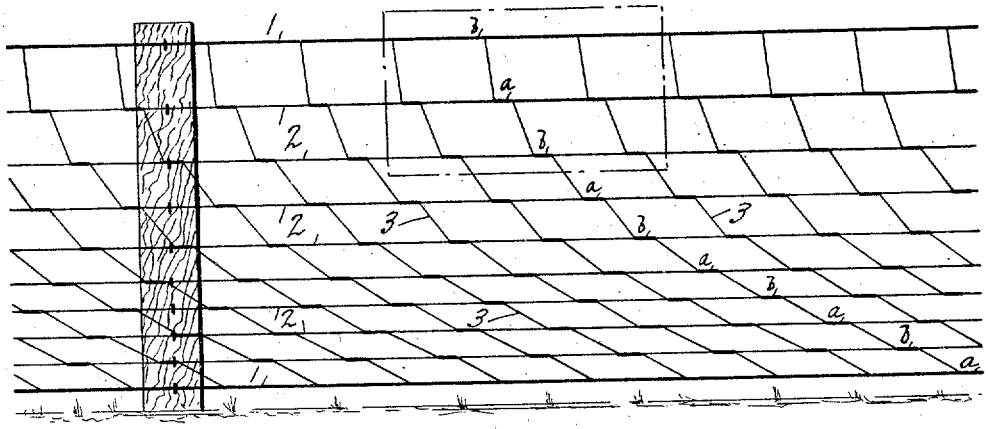
Figure 2:
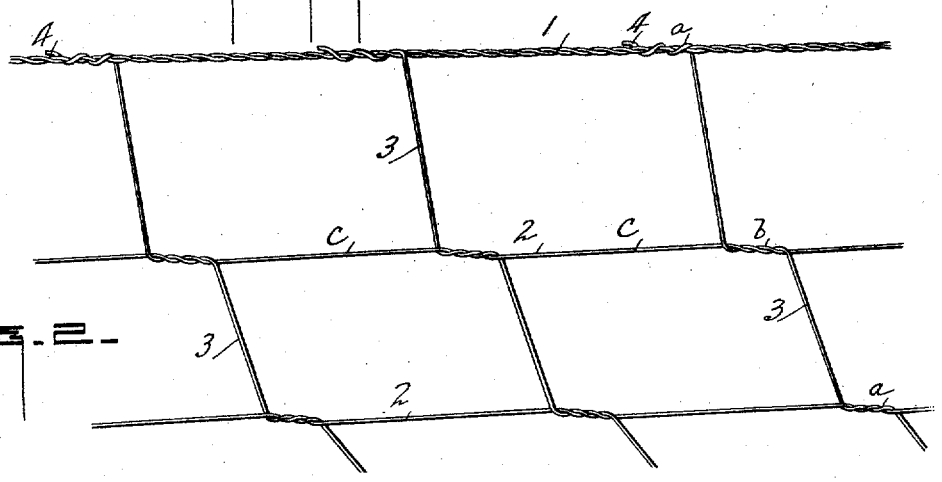

In the accompanying drawings, Figure 1, drawn to a small scale, shows a strip of fencing embodying my improvement as it appears when placed in the field. Fig. 2, drawn to a larger scale, shows more clearly the detail construction of the fence and is a section from Fig. 1 bounded by the dotted lines shown in such figure.

Like numerals of reference indicate corresponding features in both of the figures.

The fence comprises what will be hereinafter known as the "selvage-wires" 1 and the "body-wires" 2, arranged at suitable intervals apart from each other to present a uniform or graduated mesh, as desired, and 3 indicates stays, preferably of wire, spaced at suitable intervals apart and adapted, as shown, to be intertwisted with the selvage and body wires, which together comprise my improved fending.

Attention is called to the selvage-wires 1, which I have shown as twisted cable strands; but it is to be understood that the selvage-wires may comprise each a single wire of suitable strength in proportion to the heft of the body-wires common in all fences.

In carrying out the manufacture of the fence fabric above outlined it is my aim to place the stay-wires obliquely or diagonally to the longitudinal bearing of the body and selvage wires, wherein rectangular meshes are formed having substantially horizontal top and bottom wires and sloping or slanting end wires. It is also adapted to cause the stay-wires to be connected or intertwisted with coinciding body and selvage wires alternately over and under. By reference to Fig. 1, attention being directed to the first complete stay-wire 3 to the left of the said figure leading from the lower selvage-wire 1, the same is intertwisted with the selvage 1 at small *a* a portion of its length. It is then led diagonally or obliquely to the adjacent body-wire 2 and connected or intertwisted therewith and continued to be so led until it coincides with the upper selvage-wire 1, with which it may be intertwisted or wrapped around and the end of the stay-wire directed longitudinally along the selvage, as at 4. The appearance of the stay-wires at the bottom of the fabric will be the same as at the top or upper end, and the stay just referred to as it is brought coincident with each succeeding longitudinal wire is connected or intertwisted therewith in opposite directions, as at *a* and *b*—that is, the stay-wires are intertwisted with the longitudinal wires in opposite directions by leading the said stay-wires first over a longitudinal wire and then under the same, as seen in the figures. By following each stay from right to left in Fig. 2 the intertwists appear in opposite directions, but follow a series of twists in a diagonal line from left to right, Fig. 2, crossing a series of stays and body wires, and the twists all appear similar.

In producing a fence fabric such as herein illustrated and described it will be noticed that the stay-sections bear in oblique lines always in advance of their twists with the lower selvage-wire and behind their twists with the upper selvage-wire. The graduation of the meshes and the diagonal bearing of the stay-wires presents a stay-wire forming an arc between its ends. To this end the fabric is serviceable not only for the larger cattle, but for hogs and other small cattle as well, for the diagonal bearing of the stays when the body and selvage wires are close together presents a mesh with very little open space between the wires, all of which it is believed will be understood.

Attention is now called to the body-wires, which are slightly drawn out of horizontal line where the twist is made with the stay-wires, occasioned by the peculiar manner in which the stays are carried. The twists slant in one direction, while that portion of the body-wires intermediate the twists, as at *c*, slant in an opposite direction. Attention has been called to the variation in the slant of the stays or that portion of each stay intermediate or connecting the body and selvage wires, the graduation in the meshes causing the stay-wires to slant more where the longitudinal wires are closest and less where they are farthest apart. However, the exact incline or diagonal bearing of the stays may be modified, as also the arrangement of the body-wires, and it may be convenient instead of twisting both the body and the stay wires where they intersect to twist only the stays around the body-wires, or vice versa, or twist the stay and partially twist the body-wires, all of which it is believed will come within the spirit and scope of the invention.

I have preferred in illustrating the fabric to show alternate stay-wires where they intersect with corresponding longitudinal wires to be connected or twisted therewith in opposite directions. For example, see the second stay to the left of Fig. 1, and it is shown having its twist with the selvage-wire just opposite to that of the first stay. In this way adjacent stay-wires where they are connected or intertwisted with a body or selvage wire will be in opposite directions not only vertically, but longitudinally. (See Fig. 2.)

Having thus fully described my invention, what I claim, and desire to secure by Letters Patent of the United States, is—

1. A wire-fence fabric, composed of body-wires and selvage-strands, of stay-wires extending obliquely across the body-wires from selvage-strand to selvage-strand and at each succeeding point of intersection with the selvage-strands and body-wires twisted therewith alternately over and under, substantially as specified.

2. In a wire-fence fabric, the combination of a series of body-wires, and stay-wires, extending obliquely across the body-wires from selvage to selvage, the twist of adjacent stays with corresponding body-wires being alternately over and under and having the twists measured along the body-wires in the same direction, substantially as specified.

3. In a wire-fence fabric, the combination of a series of body-wires and selvage-strands, stay-wires extending obliquely across the series of body-wires and twisted with adjacent body-wires alternately over and under, and adjacent stays twisted with corresponding body-wires alternately over and under and having the twists measured along the body-wires in the same direction, substantially as specified.

4. In a wire-fence fabric, the combination of a series of body-wires and selvage-strands, stay-wires extending obliquely across the body-wires from selvage to selvage and twisted with adjacent body and selvage wires, alternately over and under and having the twists of the stays and body-wires measured along the body-wires in the same direction, and short longitudinally-presented extensions of each stay where they are twisted with the selvage-strands, substantially as specified.

5. In a wire-fence fabric, the combination of a series of running-wires, of stay-wires bearing obliquely across the running-wires and twisted with the running-wires where they intersect, the twist of the stay-wires as they bear diagonally across the fabric from right to left being alternately over and under and having their twists uniform in a line bearing diagonally across the fabric from left to right, substantially as specified.

6. In a wire fence, the combination of a series of body-wires and selvage-wires, stay-wires intertwisted with the body-wires and selvage-wires and alternate stay-wires where they intersect with the body and selvage wires being intertwisted therewith alternately over and under, that portion of the body-wires where they intertwist with the stay-wires inclined slightly out of horizontal, while that portion of each body-wire intermediate each twist is inclined slightly out of horizontal but in an opposite direction to the incline of the twisted portion.

7. A wire fence, composed of body-wires and selvage-wires, of stay-wires extending across the body-wires from selvage-wire to selvage-wire and each stay at each succeeding point of intersection with the selvage and body wires twisted therewith alternately over and under, the stay-sections between the selvage and body wires bearing in oblique lines and always in advance of their twists with the lower selvage-wire and behind their twists with the upper selvage-wire, substantially as specified.

8. In a wire-fence fabric, the combination of running-wires, stay-wires extending obliquely across the running-wires, adjacent stay-wires where they intersect with corresponding running-wires twisted therewith alternately over and under both across the running-wires and measured along corresponding running-wires, substantially as specified.

9. A wire fence, composed of body-wires and selvage-strands, of stay-wires extending obliquely across the body-wires from selvage-strand to selvage-strand and forming an arc between their ends, the said stays at each succeeding point of intersection with the selvage-strands and body-wires twisted therewith alternately over and under, substantially as specified.

In testimony whereof I have affixed my signature in presence of two subscribing witnesses.

THOMAS LITWILLER.

Witnesses:
J. M. SAWYER,
H. L. SCHMUTZ.